May 6, 1952     H. H. LANGDON     2,595,393
FLEXIBLE COUPLING
Filed June 20, 1946     3 Sheets-Sheet 1
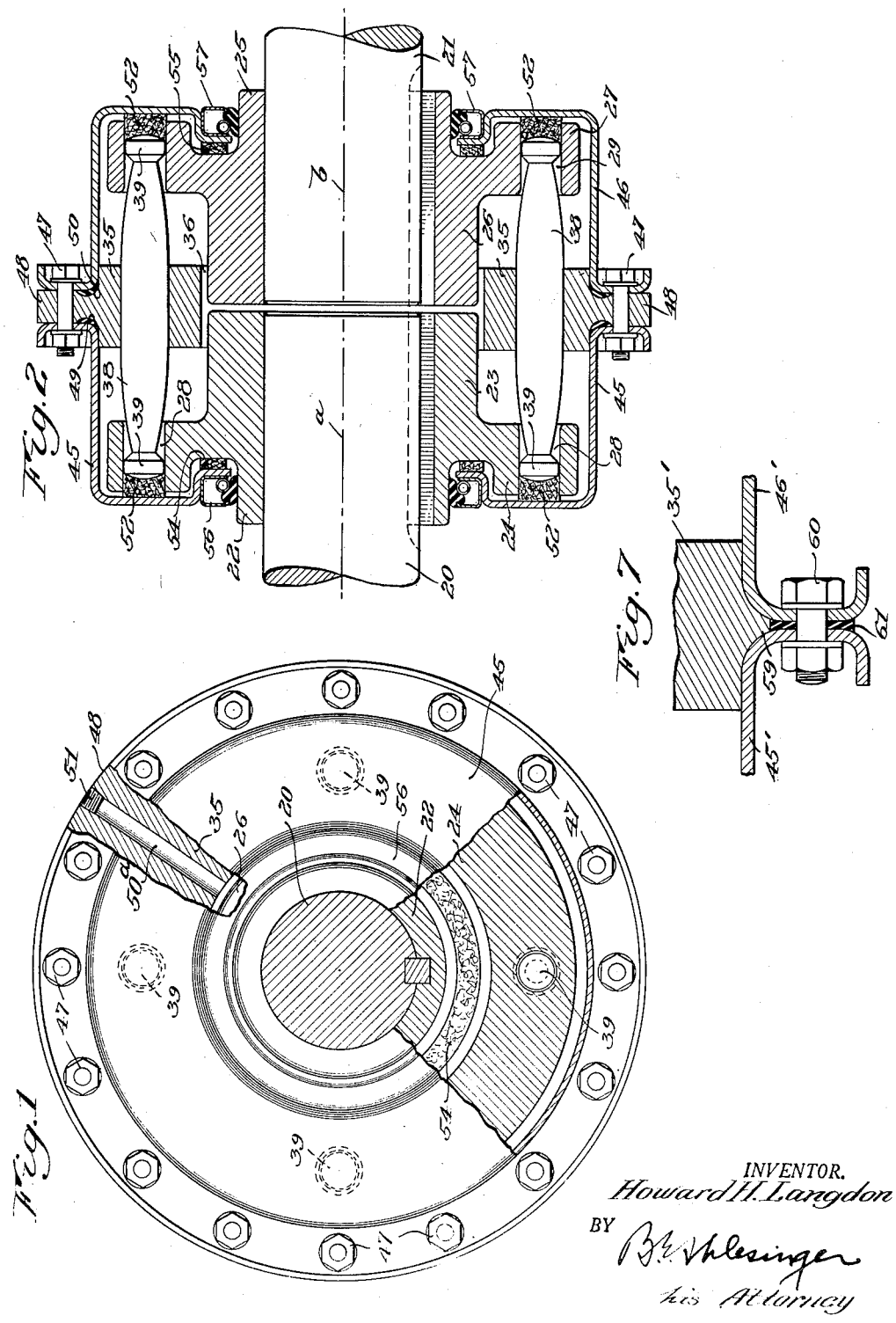
INVENTOR.
Howard H. Langdon
BY
his Attorney May 6, 1952 H. H. LANGDON 2,595,393
FLEXIBLE COUPLING
Filed June 20, 1946 3 Sheets-Sheet 2
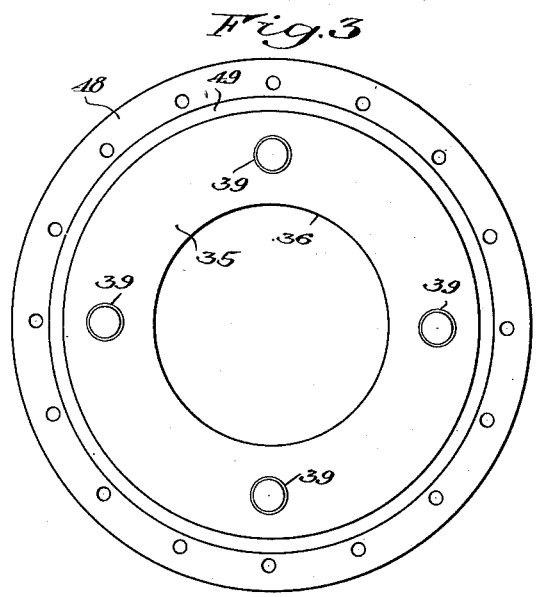
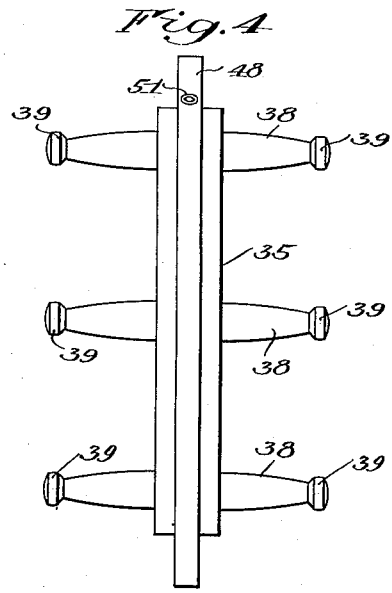
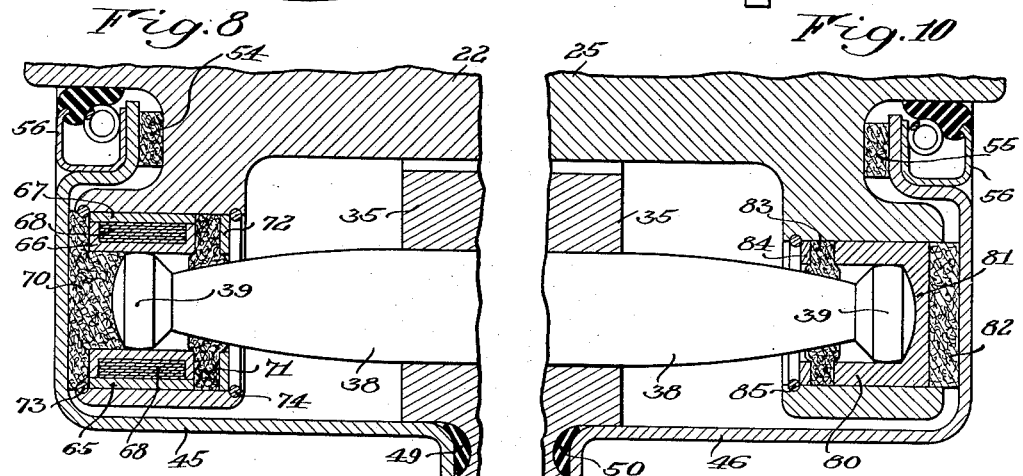
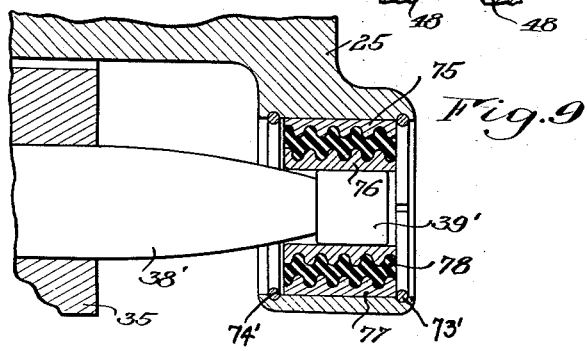
INVENTOR.
Howard H. Langdon
BY
his Attorney May 6, 1952 H. H. LANGDON 2,595,393
FLEXIBLE COUPLING
Filed June 20, 1946 3 Sheets-Sheet 3
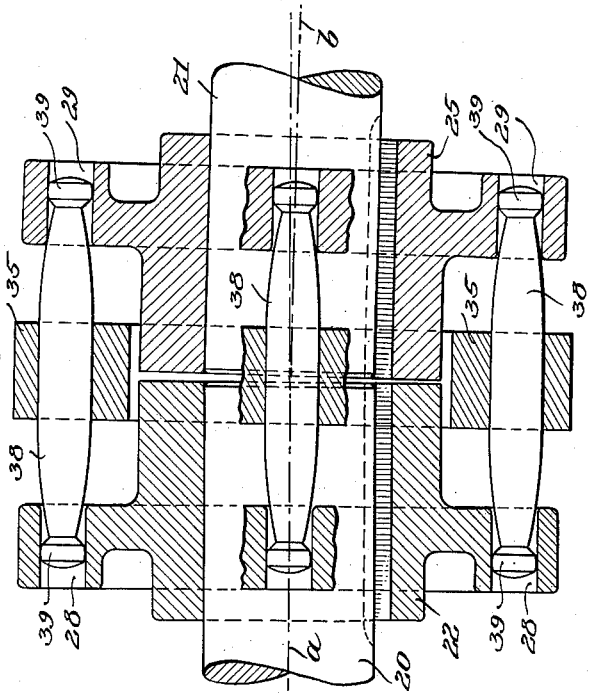
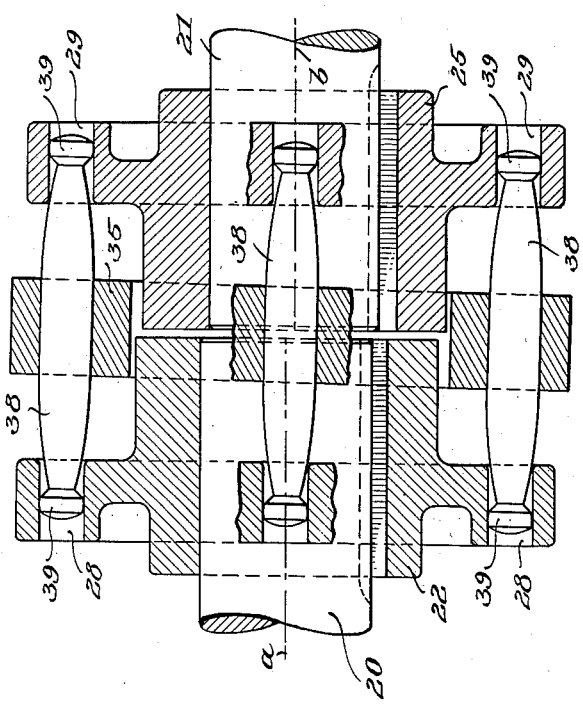
INVENTOR.
Howard H. Langdon
BY
his Attorney Patented May 6, 1952

2,595,393

UNITED STATES PATENT OFFICE 2,595,393

FLEXIBLE COUPLING

Howard H. Langdon, Rochester, N. Y., assignor to Consolidated Machine Tool Corporation, Rochester, N. Y., a corporation of Delaware Application June 20, 1946, Serial No. 678,039

14 Claims. (Cl. 64—15)

The present invention relates to couplings and particularly to flexible couplings of the type employed for maintaining proper driving connection between shafts despite axial misalignment of the shafts.

The problem of maintaining proper driving connection between drive and driven shafts, even when the shaft axes are somewhat misaligned, is old, and many different forms of flexible couplings have been devised for this purpose. Some types of these couplings employ flexible springs of convolute form for connecting the driving and driven parts. Others employ internally and externally toothed members and achieve flexibility by some such provision as slotting the hub or sleeve portion of one or both of the toothed members in line with the roots of the teeth, so that the teeth may bend or yield to take the load or misalignment. In still other types of these flexible couplings, two hub members are secured to the two shafts and are connected together by flat springs or pins. The present invention relates, in particular, to a flexible coupling of this third general type.

Flexible couplings as heretofore made are limited in their load carrying capacity and, moreover, are quite expensive. For heavy loads, the couplings, which employ convolute springs, get so large, in fact, that they are no longer practical. The toothed type couplings have the disadvantages, also, that the loads are borne unequally by the different teeth and that flexibility depends upon distortion of the teeth that are in engagement at a particular moment or of the housing that supports the teeth. Flexible couplings of the third type as heretofore designed are difficult to manufacture accurately and in some cases become more rigid with increasing loads which is a distinct disadvantage.

One object of the present invention is to provide a flexible coupling which will be cheaper and easier to manufacture than flexible couplings of previous designs.

Another object of the invention is to provide a flexible coupling which can be made accurately very easily.

Another object of the invention is to provide a flexible coupling which for a given size has a greater load-carrying capacity than previous designs of such couplings.

A further object of the invention is to provide a type of flexible coupling which can readily be made in quantity on a production basis and still be built easily to meet a particular customer's requirements as to torsional flexibility.

Another object of the invention is to provide a flexible coupling using cantilever type springs to connect the coupled parts, which are so constructed as to obtain substantially constant stress at each cross-section of the pin over its effective length, thus permitting maximum deflection of the coupling.

A further object of the invention is to provide a coupling which is capable of flexing relative to the severity of variation in the forces transmitted through the coupling so as to reduce the range of stresses in the coupled parts and in the coupling itself.

Another object of the invention is to provide a coupling so constructed as to dampen shock and vibration and reduce to a minimum the possibility of transmitting shock and vibration forces from one coupled part to the other.

Still another object of the invention is to provide a flexible coupling which by its own action will lubricate itself, thus minimizing possibility of wear.

A still further object of the invention is to provide a coupling so constructed that the forces due to misalignment are equalized and neutralized to the greatest possible extent.

Other objects of the invention will be apparent hereinafter from the specification and from the recital of the appended claims.

In a coupling constructed according to the present invention, there are two hub members which are adapted to be secured to the two shafts that are to be coupled together, and there is a central ring disposed between the two hub members and connected to them both by flexible pins. The central member has holes in it in which the pins are secured, and the hub members have holes in them in which the opposite ends of the pins are received and slide. The pins are round in cross-section and each decreases in diameter from its central portion, which is mounted in the ring, toward both its ends. The pins are provided with a true cantilever cross-section, providing constant stress over the length of the pins from the center ring to their seats in the hub members, thus permitting maximum deflection. The center ring is bored so that the diameter of its bore is sufficiently greater than the outside diameters of the portions of the hub members, over which it fits, to clear these hub members in any position of misalignment within the range of the coupling. The ring is, therefore, free to float and forces due to misalignment are equalized and neutralized to the greatest possible extent.

In the drawings:

Fig. 1 is an end view, with parts broken away, of a coupling constructed according to one embodiment of this invention, one of the shafts, which are connected by the coupling, being shown in section;

Fig. 2 is a sectional view at right angles to Fig. 1, showing the coupling and the two shafts, which it connects, in an axial plane of the shafts;

Fig. 3 is an end view and Fig. 4 a side elevation, on a somewhat reduced scale, of the center or carrier ring assembly of the coupling;

Fig. 5 is a more or less diagrammatic view, illustrating the positions taken by the parts of the coupling when the two shafts, which it connects, are laterally misaligned, that is, have their axes parallel to but offset from one another;

Fig. 6 is a more or less diagrammatic view, illustrating the positions of the parts of the coupling when the two shafts, which it connects, have their axes angularly misaligned;

Fig. 7 is a fragmentary sectional view illustrating a slight modification in the structure of the central ring and of the housing for the coupling;

Fig. 8 is a fragmentary sectional view, illustrating a modification of the invention in which means is provided for dampening the shock and vibrations, which might otherwise be transmitted between the connected parts, while retaining the characteristic flexibility of the coupling;

Fig. 9 is a fragmentary sectional view showing a further modification of the invention with which dampening may also be obtained while retaining flexibility; and Fig. 10 is a fragmentary sectional view of a further modification of the invention illustrating a construction through which the load between the flexible pins and the hub members may be spread, and the load per unit area reduced.

Referring first to Figs. 1 to 6 inclusive, 20 and 21 denote the shafts which are to be coupled together. Keyed to the shaft 20 is a disc or hub member 22 which is formed to have a hub portion 23 and a collar or flange portion 24. Keyed to the shaft 21 is a disc or hub member 25 which is formed with a hub portion 26 and a flange or collar portion 27. The two members 22 and 25 may be of identical construction, but are mounted, as shown in Fig. 2, with their flange or collar portions 24 and 27 remotely spaced from one another. The hub member 22 is provided with a plurality of equi-spaced holes 28, and the hub member 25 is provided with a plurality of equi-spaced holes 29. The holes in the two members are of the same size and number and are axially aligned when the two shafts 20 and 21 are in their normal axially aligned position, shown in Fig. 2.

Mounted between the flange or collar portions of the members 22 and 25 is a central carrier ring 35. The bore 36 of this ring fits over the adjacent hub portions 23 and 26 of the members 22 and 25, and the diameter of the bore 36 of the ring is sufficiently greater than the outside diameters of the hub portions 23 and 26 of the members 22 and 25 as to clear these hub portions in all positions of misalignment of the shafts 20 and 21 within the range of operativeness of the coupling. The central member 35 is provided with a plurality of holes equal in number to the holes in the members 22 and 25, and axially aligned with such holes when the two shafts are in their normal axially aligned position, shown in Fig. 2.

Mounted within the holes of the central member with a pressed fit therein are a plurality of pin or spring members 38. These pins 38 are generally ball-shaped at their opposite ends as denoted at 39. The pins are circular in cross-section, and decrease in diameter from their central portions, which are mounted in the carrier 35, toward their ball shaped ends 39. The pins are, therefore, of general cantilever form at opposite sides of the central member 35 and constitute flexible spring means for connecting the members 22 and 25 and the shafts 20 and 21 to which these members are secured. The holes 28 and 29 of the hub members 22 and 25 are of substantial longitudinal length and extend parallel to the axes of shafts 20 and 21, and the central member 35 is so disposed that the ball ends 39 of the pins engage and slide within the holes 28 and 29 when the shafts are rotating in misalignment.

Figs. 5 and 6 illustrate the action of the coupling in use. In Fig. 5, a condition is shown where the axes $a$ and $b$, respectively, of the two shafts 20 and 21 are misaligned by being off-set from but parallel to one another. Three of the pins 38 are shown. As the shafts revolve, the carrier 35 assumes a position normal to the direction of misalignment of the shafts, and the ball ends 39 of the pins reciprocate in the holes 28 and 29 of the members 22 and 25.

In the condition illustrated in Fig. 6, shafts 20 and 21 are angularly misaligned, that is, their axes $a$ and $b$ are angularly inclined to one another. Here again, however, the carrier 35 assumes a position normal to the direction of misalignment, and, as the shafts rotate, the ball ends of the pins reciprocate in the holes in the members 22 and 25.

In use, members 22 and 25, and the member 35 with the pins 38, are enclosed within an oil-retaining housing comprising the two bell-shaped shells 45 and 46. The two bell portions of the housing are secured by bolts 47 to opposite sides of a flange 48 formed on the central member 35. To prevent leakage of oil around these connections, sealing rings 49 and 50 are mounted between the housing sections and the flange 48. These sealing rings may be made of neoprene or other similar suitable material. The lubricating oil can be supplied to the coupling through a hole 50a (Fig. 1) drilled in the carrier ring 35 radially thereof. The outer end of this hole is plugged by the plug 51.

Mounted in each of the holes 28 and 29 between the shells 45 and 46 and the ends of the pins 38 are plugs 52. These plugs are made of felt or other suitable material which will absorb oil by capillary attraction, and, as the shafts revolve, in misalignment, these plugs are alternately compressed between the ends 39 of the pins 38 and the interior walls of the housing sections 45 and 46, and released. When the plugs are compressed, oil is squeezed out of them to lubricate the bearing surfaces of the holes 28 and 29 as the pins reciprocate in the holes.

In a coupling built as described, the holes in the hub members surround the ends of the pins, and when the ball ends of the pins press against the insides of the holes, as happens when the shafts are misaligned, there is elastic deformation of the pins. The ball ends of the pins flatten out and take the form of an ellipse whose length rapidly increases on the inside of the hole under increasing torque pressures. Thereby the ends of the pins have greater areas of contact with the holes, and thus the coupling can carry a greater load. The present structure has the additional advantage that when the shafts are misaligned and the area of contact between the pin and hole is modified, this modified area of contact provides an excellent wedge shape for distributing the lubricant over the contacting surfaces of pins and holes as the ends of the pins reciprocate in the holes.

Felt cushioning rings 54 and 55 may be provided between the housing sections 45 and 46, respectively, and the members 22 and 25, respectively, to cushion the movements of the housing sections as the ring 35 shifts for misalignment of the shafts. Standard oil seals 56 and 57 may be mounted on the external hub portions of the members 22 and 25, respectively, to prevent leakage of the oil from the housing around the felt plugs 52 and the cushioning rings 54 and 55. With this construction, a level of oil is maintained in the housing at least to the level of this oil seal. This quantity of oil when thrown out centrifugally as the carrier 35 rotates with the shafts, will form a ring of oil of sufficient depth to wet the felt plugs 52 at the ends of the spring pins at all times during operation.

An alternative construction of the housing is illustrated in Fig. 7. Here 45' and 46' denote the bell sections of the housing and 35' designates the carrier member. The carrier member in this case is formed with a peripheral lug or projection 59, and the two housing sections simply have frictional gripping engagement with this lug or projection, being secured directly together by bolts 60. A neoprene or similar ring 61 is interposed between the two housing sections to prevent leakage of oil.

Fig. 8 illustrates a modification of the invention where provision is made for molecularly dampening the transmission of torsional shock and vibration between the parts which are coupled together. This modification is based upon the principles of shock absorption and vibration dampening enunciated by Dr. C. W. Chamberlain. Here, the ball-like ends 39 of the pins 38 are mounted in bushings 65. Each bushing comprises an internal ring member 66 with which the ball end 39 of a pin 38 contacts and in which it slides, an external ring member 67 which fits into a hole 28 or 29 of hub member 22 or 25, and a laminate 68. The laminate 68 is made of very thin metal and is so closely pressed together that molecular films of oil of intense strength exist between the laminations. Thus, the laminate will dampen and absorb the shock and vibrations in driving or driven shaft and prevent transmission of these shocks and vibrations through the coupling. The alternate relays of metal and molecular oil film absorb energy in time rather than through force acting through distance against frictional resistance as is generally done. A felt plug 70 is provided as before at the outer end of each hole and an additional felt plug 71 may be provided around the pin 38 at the inner end of each hole. This additional plug is adapted to be held in position by a ring or washer 72. Spring rings or clips 73 and 74 serve to hold the assembly together in place in a hole 28 or 29.

In an alternative construction, the pins may be made of the form shown at 38' in Fig. 9. Here they have cylindrical ends 39' instead of ball-like ends 39. Here the ends 39' are received in bushings 75 which consist of an inner ring 76 and of an outer ring 77, whose opposed surfaces are fluted or serrated and between which there is vulcanized a ring of neoprene or other synthetic rubber. Here torsional vibrations are absorbed in the ring 78. Spring rings or clips 73' and 74' hold the bushing in place in its hole, and as with previously described embodiments of the invention, felt plugs (not shown) are preferably used for lubrication purposes.

With any of the embodiments shown in Figs. 1 to 6 inclusive or Fig. 8, the ball ends 39 of the pins 38 have normally only point or line contact with the holes in the hub members or in the bushings in which the ball ends are engaged, although, as previously described, this changes to limited elliptical area contact under load. To distribute the load over a greater area, the ball ends of the pins may be mounted in bushings such as shown at 80 in Fig. 10. In this case the pins bear upon the inside of the bushings with freedom to adjust for flexure of the pins, but without reciprocation. These bushings are of cup shape with the bottoms of the cups of generally concave spherical shape to receive the convex tips 81 of the pins. The cups are adapted to reciprocate in the holes 28 or 29 of the hub members 22 and 25. Felt plugs 82 may be mounted between the outside of each cup and the adjacent housing section 45 or 46. Other felt rings 83 may be mounted on the pins to contact the inner ends of the cups. These last named rings may be held in position by a washer or ring 84 which is secured in place by a spring ring or clip 85.

Other modifications of the invention are possible. Heretofore, couplings using springs or pins and hub members have had the pins or springs inserted in peripheral slots in the hub members. Not only is the load carrying capacity of such a coupling reduced as compared to the coupling of the present invention in which the pin-ends engage in holes in the hub members, but such a coupling is much more expensive to make than the present coupling. A coupling made according to the present invention lends itself readily to mass production. The holes for the pins in the two hub members and in the central carrier ring can be bored simultaneously and reamed simultaneously by assembling the three parts in a jig back to back. Moreover, the round-sectioned true cantilever type pins of the present invention can be forged, rough-turned in screw machines, heat-treated and ground to finish dimensions on a production basis.

The simultaneous boring and reaming of the holes in the hub members and ring insure complete accuracy and proper alignment of the holes. Moreover, the jig for boring and reaming may be fitted for drilling 3, 4, 6, 8, 10, 12 or any desired number of holes. Hence, couplings can be made on a production basis to accommodate themselves to more or less torsional deflection as required for different size, rating and flexing characteristics. When the coupling is to be flexible in torsion, the minimum number of spring pins will be used consistent with the safe stresses for the declared rating and overload of the coupling. The greater the number of pins, the less the torsional flexibility, that is, the greater the rigidity of the coupling. Thus hub and ring members might even be made according to the present invention with a standard number of holes, and the user might employ with such hub and ring members the number of pins calculated to give the desired flexibility with safety under the conditions expected to be encountered on the job on which the coupling is to be employed.

The coupling of the present invention has the further advantage that the length of the springs or pins remains constant under load which is a desirable feature. Experience has shown, also, that the cantilever form of springs used in the present invention can be designed and fabricated to have flexure, load and stress characteristics within plus or minus 5% of the expected results.

Where the coupling of the present invention is used to connect a diesel engine with an electric generator, for instance, it will absorb the cyclic piston forces of the engine and flex relative to the severity of variation in forces produced by the engine, especially when bushings of the type shown in Figs. 8 and 9 are employed. The range of vibratory or shock stresses in the two parts can be materially reduced or eliminated entirely.

With a coupling built according to the present invention, moreover, the carrier ring, which in effect is a squirrel cage assembly, is free to move, and floats independently of the hub members. Due to this freedom, it can take a position such that all stresses become a minimum and equal in all pins in the plane of misalignment, thus minimizing any stress in the pins due to misalignment. The coupling of the present invention has inherent freedom for rotational adjustment and each pin carries its share of the torque load.

While the present invention has been described in connection with particular embodiments thereof, it is to be understood that it is capable of further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A flexible coupling comprising two discs adapted to be connected, respectively, to adjacent ends of a driving and a driven shaft, each of said discs having a plurality of circular holes therein, a ring mounted between the discs, and a plurality of solid pins secured in the holes of the ring and having their opposite ends engaged in the holes of the discs, each of the pins being circular in cross-section and decreasing in diameter from its central portion, which is mounted in a hole of the ring, toward both its ends.

2. A flexible coupling comprising two discs adapted to be connected, respectively, to adjacent ends of a driving and a driven shaft, each of said discs having a plurality of holes therein, a ring mounted between the discs, and a plurality of pins mounted in the ring and having their opposite ends engaged in the holes of the discs, each of said pins being circular in cross-section and decreasing in diameter from its central portion, which is mounted in the ring, toward both its ends, and each of the pins having ball-shaped ends which are received in the holes of the discs.

3. A flexible coupling comprising two discs having hub portions that are adapted to be connected, respectively, to adjacent ends of a driving and a driven shaft, and each having a plurality of circularly arranged holes therein, a ring mounted between the discs having a plurality of circularly arranged holes that are normally in axial alignment with the holes of the discs, and a plurality of solid pins secured in the holes of the ring and having their opposite ends engaged slidingly in the holes of the discs, each of said pins being circular in cross-section and decreasing in diameter from its central portion, which is secured in the ring, toward both its ends, and each of said pins having ball-shaped ends which are received in the holes of the discs.

4. A flexible coupling comprising two discs adapted to be connected, respectively, to adjacent ends of a driving and a driven shaft, each of said discs having a plurality of elongated holes therein extending parallel to the axis of the disc, a ring member mounted between the discs and having a plurality of pins projecting from opposite sides thereof in the general direction of the axis of the ring whose ends engage slidingly in the holes of the discs, said pins being circular in cross-section and decreasing in diameter from the ring toward their ends, the ring member being free to float between the discs and being supported from the discs wholly by the pins.

5. A flexible coupling comprising two discs adapted to be connected, respectively, to adjacent ends of a driving and a driven shaft, each of said discs having a plurality of elongated holes therein extending parallel to the axis of the disc, a ring member mounted between the discs and having a plurality of pins projecting from opposite sides thereof in the general direction of the axis of the ring member to engage in the holes of the discs, said ring member being free to float between the discs and being supported from the discs wholly by said pins, an oil-retaining housing, comprising two bell-shaped parts, secured to the ring member to enclose the discs and surround the adjacent ends of the shafts, and cushioning means disposed between the parts of the housing and the adjacent parts of the discs.

6. A flexible coupling comprising two discs adapted to be connected, respectively, to adjacent ends of a driving and a driven shaft, each of said discs having a plurality of holes therein, a ring mounted between the discs, a plurality of pins secured in the ring and having their opposite ends engaged in the holes of the discs, housing members surrounding the discs and ring and adapted to retain oil, and plugs of capillary material mounted in the holes of the discs between the ends of the pins and the housing members and adapted to be compressed on reciprocation of the pins in the holes to lubricate the contacting surfaces of the pins and holes.

7. A flexible coupling comprising two discs adapted to be connected, respectively, to adjacent ends of a driving and a driven shaft, each of said discs having a plurality of elongated holes therein extending parallel to the axis of the discs, a ring member mounted between the discs and having a plurality of pins projecting from opposite sides thereof in the general direction of the axis of the ring member to engage in the holes of the discs, the ring member being free to float between the discs and being supported from the discs wholly by the pins, an oil-retaining housing comprising two bell-shaped parts secured to the ring member to enclose the discs and surround the adjacent ends of the shafts, and plugs of capillary material mounted in the holes of the discs between the ends of the pins and the adjacent parts of the housing, and oil seals between the discs and the housing parts.

8. A flexible coupling comprising two discs adapted to be connected, respectively, to adjacent ends of a driving and a driven shaft, each of said discs having a plurality of elongated holes therein which are parallel to the axis of the disc, a ring mounted between the discs, and a plurality of pins projecting from opposite faces of the ring in the general direction of the axis of the ring and having their ends engaged in holes of the discs, each of said pins being circular in cross-section and decreasing in diameter from the ring toward a disc and having a ball-shaped end which is engaged in a hole of a disc.

9. A flexible coupling comprising two rigid discs adapted to be connected, respectively, to adjacent ends of a driving and a driven shaft, each of said discs having a plurality of elongated axially extending holes therein, bushings secured in the holes, a rigid ring mounted between the discs, and a plurality of pins secured in the ring and projecting axially beyond opposite side faces of the ring, each of said pins being circular in cross section and decreasing in diameter from the ring to a point adjacent each end and then being of increased diameter again to provide an enlarged end, opposite ends of each pin being slidably engaged in two of the bushings carried by said two discs.

10. A flexible coupling comprising two rigid discs adapted to be connected, respectively, to adjacent ends of a driving and a driven shaft, each of the discs having a plurality of axially extending holes therein, bushings mounted in the holes, a rigid ring mounted between the discs, and a plurality of solid pins secured in the ring and having ends projecting axially beyond opposite side faces of the ring and engaged in the bushings, each of said pins being circular in cross section and decreasing in diameter from the ring toward a point adjacent each end and then being enlarged in diameter again to have enlarged ends, and each of the bushings having its interior shaped to fit an end of the pin which is received therein and having its exterior shaped to fit and reciprocate axially in the hole in which it is mounted.

11. A flexible coupling comprising two discs adapted to be connected, respectively, to adjacent ends of a driving and a driven shaft, each of the discs having a plurality of elongated holes therein, bushings secured in the holes, a ring mounted between the discs, and a plurality of pins secured in the ring and having their ends engaged in the bushings, each of the bushings comprising a sleeve which is slideable in a hole, a sleeve in which an end of a pin is received, and a thin metal spirally wound laminate connecting the two sleeves and arranged between them.

12. A flexible coupling comprising two rigid discs adapted to be connected, respectively, to adjacent ends of a driving and a driven shaft, each of said discs having a plurality of axially extending holes therein, bushings mounted in the holes and held against axial movement therein, a rigid ring mounted between the discs, a plurality of pins secured in the ring and projecting axially from opposite side faces thereof, each of said pins being circular in cross section and decreasing in diameter from said ring toward a point adjacent each end and then increasing in diameter again to have enlarged ends, opposite ends of each pin engaging slidably in two of the bushings mounted in two of said discs, and means interposed between the bushings and the discs to dampen vibration.

13. A flexible coupling comprising two discs adapted to be connected, respectively, to adjacent ends of a driving and a driven shaft, each of said discs having a plurality of holes therein, a bushing mounted in each hole and comprising an outer sleeve and an inner sleeve which are connected by elastic material, the outer sleeve being mounted to slide in the hole, a ring mounted between the discs, and a plurality of pins secured in the ring to project from opposite side faces thereof, each of said pins being circular in cross section and decreasing in diameter from the ring to a point adjacent each of its ends and then increasing in diameter again so that each end is enlarged, opposite ends of each pin being engaged in the inner sleeves of two of the bushings secured in said discs.

14. A flexible coupling comprising two discs adapted to be connected, respectively, to adjacent ends of a driving and a driven shaft, each of the discs having a plurality of elongated holes therein which extend parallel to the axis of the disc, a ring mounted between the discs, and a plurality of pins projecting from opposite side faces of the ring in the general direction of the axis of the ring, each of said pins being circular in cross-section and decreasing in diameter from the ring toward its outer end, the outer ends of the pins being, however, of ball-shape and being received within the holes of the discs, and a two-part housing connected to opposite sides of the ring and enclosing the discs and surrounding the shaft, and oil seals between the discs and the parts of the housing.

HOWARD H. LANGDON.

REFERENCES CITED

The following references are of record in the file of this patent:

UNITED STATES PATENTS

| Number | Name | Date |
|---|---|---|
| 1,358,537 | Francke | Nov. 9, 1920 |
| 1,482,097 | Smith | Jan. 29, 1924 |
| 1,642,907 | Sundh | Sept. 20, 1927 |
| 1,821,214 | Hahn | Sept. 1, 1931 |
| 1,865,330 | McLeod | June 28, 1932 |

FOREIGN PATENTS

| Number | Country | Date |
|---|---|---|
| 524,749 | England | 1940 |
| 36,686 | Austria | 1909 |